(12) United States Patent
Faraone et al.

(10) Patent No.: US 9,509,060 B2
(45) Date of Patent: Nov. 29, 2016

(54) OPEN WAVEGUIDE BEAMFORMING ANTENNA FOR RADIO FREQUENCY IDENTIFICATION READER

(71) Applicant: SYMBOL TECHNOLOGIES, LLC, Lincolnshire, IL (US)

(72) Inventors: Antonio Faraone, Fort Lauderdale, FL (US); Giorgi Bit-Babik, Plantation, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 78 days.

(21) Appl. No.: 14/462,762

(22) Filed: Aug. 19, 2014

(65) Prior Publication Data

US 2016/0056542 A1 Feb. 25, 2016

(51) Int. Cl.
*H01Q 13/10* (2006.01)
*H01Q 21/06* (2006.01)
*H01Q 21/00* (2006.01)
*H01Q 1/22* (2006.01)
*H01Q 9/04* (2006.01)
(Continued)

(52) U.S. Cl.
CPC .......... *H01Q 21/064* (2013.01); *H01Q 1/2216* (2013.01); *H01Q 9/0464* (2013.01); *H01Q 13/10* (2013.01); *H01Q 13/16* (2013.01); *H01Q 21/0006* (2013.01); *H01Q 21/0087* (2013.01); *G06K 7/10346* (2013.01)

(58) Field of Classification Search
CPC .... H01Q 13/10; H01Q 21/064; H01Q 13/16; H01Q 9/0464
USPC ................. 343/767, 770, 769, 771
See application file for complete search history.

(56) References Cited

U.S. PATENT DOCUMENTS

| | | | | |
|---|---|---|---|---|
| 2,562,332 A * | 7/1951 | Riblet | ................... | H01Q 13/10 333/113 |
| 3,022,506 A * | 2/1962 | Goebels, Jr. | ....... | H01Q 21/0012 343/766 |
| 3,063,049 A * | 11/1962 | Kelly | ................... | H01Q 13/10 343/771 |

(Continued)

FOREIGN PATENT DOCUMENTS

| AU | 199059089 A | 1/1991 |
|---|---|---|
| AU | 2007234730 A1 | 10/2007 |

(Continued)

OTHER PUBLICATIONS

IEEE Multiple Beams Scanning Double Square Loop Antenna for UWB Communications, Arunm Raaza, Amit Mehta, 2010.

*Primary Examiner* — Tho G Phan

(57) ABSTRACT

An open waveguide antenna for a radio frequency identification reader includes a conductive annular waveguide concentric about an axis and configured for operation within an operating frequency band. A radiating slot is formed in at least one wall of the waveguide is also concentric about the axis. An odd-multiple of ports are electrically coupled to the annular waveguide, where the ports are equally spaced around the waveguide at a spacing between adjacent ports of one-half of a guided wavelength at a center frequency of the operating band. A second waveguide, smaller than the first, can also be incorporated. The second waveguide can have a different slot arrangement and fewer ports. The rectangular waveguides can operate in a non-transverse electromagnetic mode, and the ports can be individually driven to beamform the radiated signal of the antenna.

14 Claims, 5 Drawing Sheets

(51) Int. Cl.
*H01Q 13/16* (2006.01)
*G06K 7/10* (2006.01)

(56) References Cited

U.S. PATENT DOCUMENTS

| | | | |
|---|---|---|---|
| 3,417,400 A | 12/1968 | Black | |
| 3,665,480 A | 5/1972 | Fassett | |
| 4,200,873 A | 4/1980 | Seeley | |
| 4,994,817 A * | 2/1991 | Munson | H01Q 13/18 |
| | | | 343/746 |
| 5,675,346 A | 10/1997 | Nishikawa et al. | |
| 6,124,833 A * | 9/2000 | Bialkowski | H01Q 13/22 |
| | | | 343/770 |
| 7,420,525 B2 | 9/2008 | Colburn et al. | |
| 8,159,394 B2 | 4/2012 | Hayes et al. | |
| 8,228,258 B2 | 7/2012 | Montgomery | |
| 8,344,820 B1 | 1/2013 | Chen et al. | |
| 2008/0180254 A1 | 7/2008 | Kajander | |
| 2008/0204326 A1 | 8/2008 | Zeinolabedin et al. | |
| 2009/0096699 A1 | 4/2009 | Chiu et al. | |
| 2010/0214177 A1 | 8/2010 | Parsche | |
| 2010/0231475 A1 | 9/2010 | Ou et al. | |
| 2012/0139806 A1 | 6/2012 | Zhan et al. | |
| 2013/0278475 A1 | 10/2013 | Sabielny | |

FOREIGN PATENT DOCUMENTS

| | | |
|---|---|---|
| EP | 1437795 A1 | 7/2004 |
| EP | 1830485 A1 | 9/2007 |
| EP | 2221915 A1 | 8/2010 |
| EP | 2372839 A1 | 10/2011 |
| GB | 1529776 | 6/1977 |
| WO | 2009142895 A2 | 11/2009 |

* cited by examiner

OPEN WAVEGUIDE BEAMFORMING ANTENNA FOR RADIO FREQUENCY IDENTIFICATION READER

BACKGROUND

Radio Frequency Identification (RFID) systems are well known and are commonly utilized for item tracking, item identification, and inventory control in manufacturing, warehouse, and retail environments. For example, an RFID reader can scan for RFID tags associated with items in a controlled area, particularly for inventory control of the RFID-tagged items.

Briefly, an RFID system includes two primary components: a reader (also known as an interrogator), and a tag (also known as a transponder). The tag is typically a miniature device that can respond, via an air interface channel, to an RF interrogating signal generated by the reader. The tag is associated with an item to be monitored and can generate an RF responding signal in response to the RF interrogating signal emitted from the reader. The RF responding signal is modulated in a manner that conveys identification data (also known as a payload) back to the reader. The identification data can then be stored, processed, displayed, or transmitted by the reader as needed. One or more readers can be mounted in a controlled inventory area, for example, in an overhead location on the ceiling, and the readers can cooperate to locate any particular tagged item in the inventory area, for instance, by triangulation.

For superior RFID tag detection and locationing coverage, it is known to provide beamforming for individual readers with an array of antenna elements that transmit the RF interrogating signal through a transmit beam that is electronically steered and scanned both in azimuth, e.g., over a steering angle of 360 degrees around a vertical plumb line or vertical axis originating from the center of an antenna of a ceiling-mounted RFID reader, and in elevation, e.g., over a steering angle span of about 90 degrees angularly away from the plumb line, and that receive the return RF responding signal through a receive beam from the tags. These conventional antenna arrays typically feature identical individual antenna elements placed at regular intervals according to a predefined lattice across a supporting planar or conical surface, Effective beamformed RFID reader scanning performance benefits from a relatively high port isolation between the antenna elements forming the array, a relatively large beam-steering angle range with a relatively narrow beam width even at large elevation angles away from said vertical axis, and the capability of synthesizing many different beam polarization states, e.g., linear, right-handed or left-handed, circular, etc. In fact, to maximize the likelihood of detecting the tag, the RFID system may benefit from the flexibility of generating multiple polarization states for each beam steering angle, thus reducing the likelihood that multi-path signal replicas confound a receiver of the reader. This typically requires each antenna element of the array to be more complex, or the design of complex signal-routing networks, both factors being associated with an increased cost and size. In a ceiling-mounted RFID reader, an RFID antenna array can extend away from the ceiling by a distance of as much as 300 millimeters and more. This is undesirably large for a convenient, unobtrusive, aesthetic installation, especially in an existing venue. Although decreasing the distance between the antenna elements and flattening the overall array profile results in a desirably smaller array, it is typically obtained at the expense of lower port isolation and poorer gain and beam-scanning performance caused by mutual coupling between antenna elements and lower gain at large elevations. Mutual coupling between the antenna elements typically results in wasted transmit power during transmission, and a lower received power from incoming signals during reception. It can also limit the effective beam steering angle range.

Accordingly, there is a need for a compact, low profile, low-cost, multi-port, antenna apparatus for an RFID reader with the characteristics of high port isolation, narrow beam width over a large range of steering angles, and high polarization synthesis capability, for enhanced performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
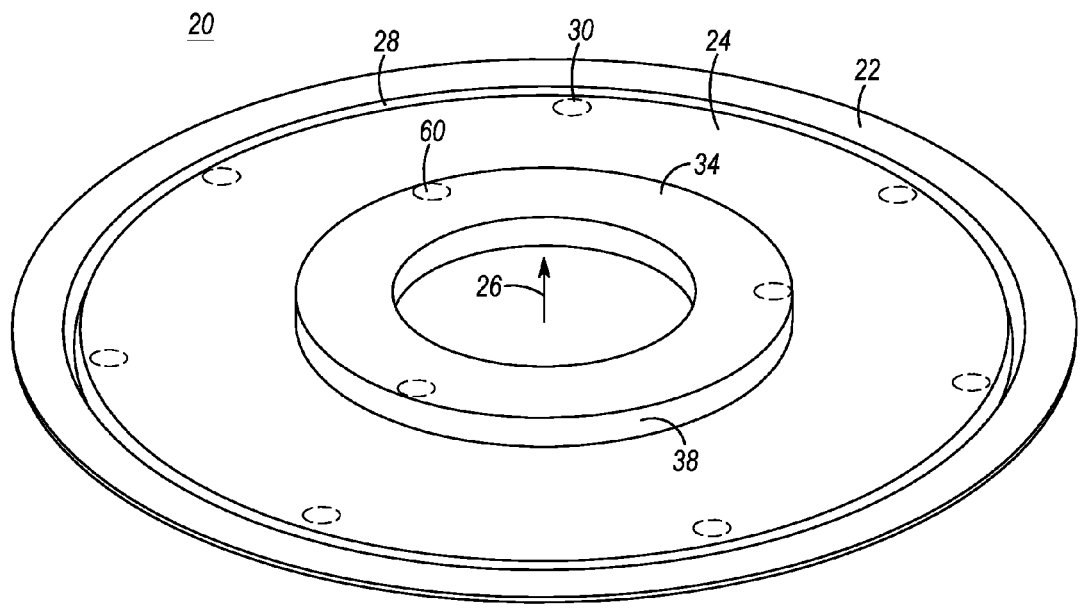
FIG. 1 is a perspective view of an antenna apparatus, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a compact, low profile, low-cost, multi-port, open waveguide antenna apparatus for a radio frequency identification (RFID) reader with the characteristics of high port isolation, narrow beam width over a large range of steering angles, and high polarization synthesis capability, for enhanced performance. In particular, the present invention includes a conductive annular waveguide concentric about an axis and configured for operation within an operating frequency band of the RFID reader. Said annular waveguide is conceptually obtained by bending a conventional rectangular waveguide along its E-plane, or alternatively along its H-plane, to form an annular structure, preferably in the shape of a circle concentric about the vertical axis. It should be noted that even if the shape of the waveguide is not circular it should be shaped such that it does not introduce significant discontinuity in the cross-section of the waveguide all along its length. A radiating slot is formed in at least one wall of the waveguide is also concentric about the axis. Said slot is preferably continuous, although some embodiments may feature discontinuous slots.

Preferably, an odd-multiple of ports are electrically coupled to the annular waveguide, where the ports are equally spaced around the waveguide at a spacing between adjacent ports of one-half of a guided wavelength at a center frequency of the operating band, said spacing ensuring that the coupling between ports is virtually zero at the center frequency. It is possible to omit some of the ports without compromising said isolation, which is essentially tied to the electrical distance between ports. A second waveguide, smaller than the first, can also be incorporated to provide additional flexibility in forming the transmit and receive beams. The second waveguide can have a different slot arrangement and fewer ports. Using an analogy with conventional rectangular waveguides, it is possible to conclude that the electromagnetic modes guided by the annular waveguides include perturbed versions of the ones supported by conventional rectangular waveguides, which are non-transverse electromagnetic (non-TEM) modes. It is well known that said non-TEM modes feature a guided wavelength which is longer than the free-space wavelength, therefore the use of non-TEM waveguides allows realizing an electrically larger antenna aperture, for a desired number of ports, and thus larger attainable gain and narrower attainable beamwidths than TEM waveguides (e.g. coaxial waveguides). In a preferred embodiment, each of the ports can be individually driven with a certain magnitude and phase of the transmitter, e.g. using individual programmable transceivers for each port, to beamform the radiated signal of the antenna. Because mutual coupling between the ports in each annular waveguide is minuscule, essentially no power is dissipated in other ports and the beam-forming is consequently more effective. The radiating slots may be realized on any of the walls of the annular waveguides, depending on the desired performance, and in some embodiment the slot may consist of the whole lateral wall of the annular waveguide or only a portion thereof.

Those skilled in the art will recognize that the figures do not depict all of the equipment necessary for system to operate but only those system components and logical entities particularly relevant to the description of embodiments herein. Further, the equipment shown includes many communication components that are not shown for the sake of simplicity. In general, components such as wired and wireless transceivers, processors, memories, and the like, are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement processors that perform the given logic. Therefore, the devices shown represent an apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. It is within the contemplation of the invention that the operating requirements of the present invention can be implemented in software, firmware or hardware, with the function being implemented in a software processor (or a digital signal processor) being merely a preferred option.

Figure 2:
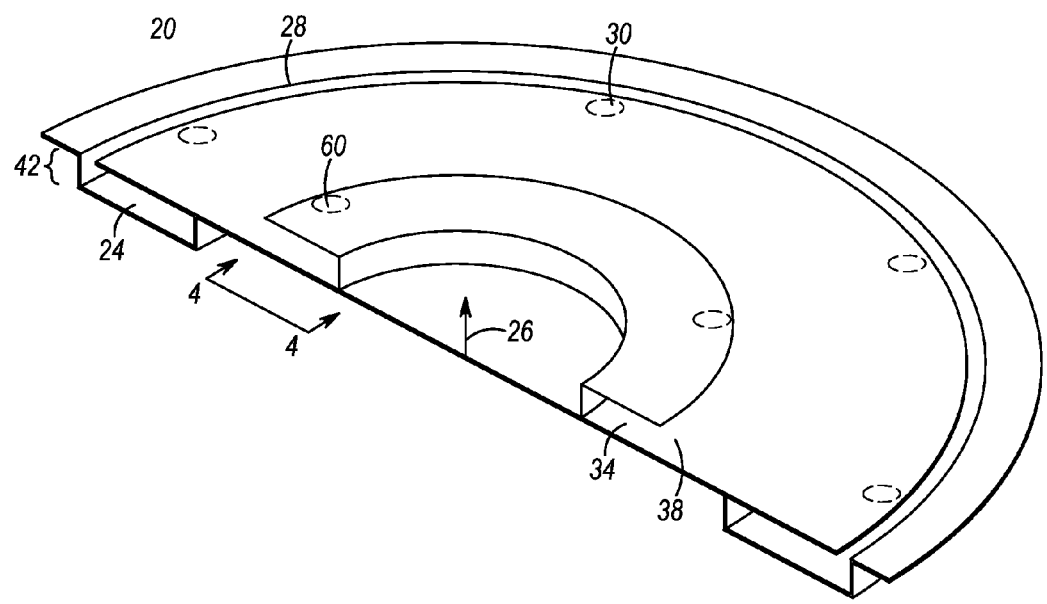
FIG. 2 is a cut-away view of the antenna apparatus of FIG. 1.
Figure 8:
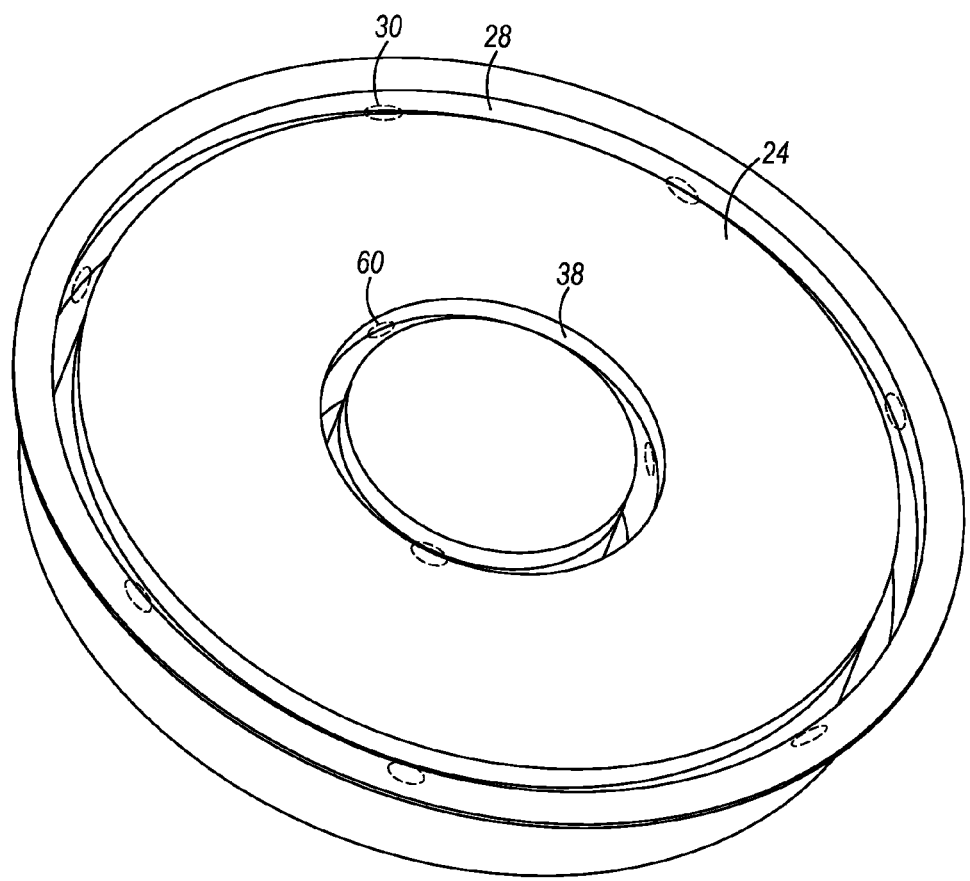
FIG. 8 is a perspective view of an alternate embodiment antenna apparatus, in accordance with some embodiments of the present invention.
Figure 9:
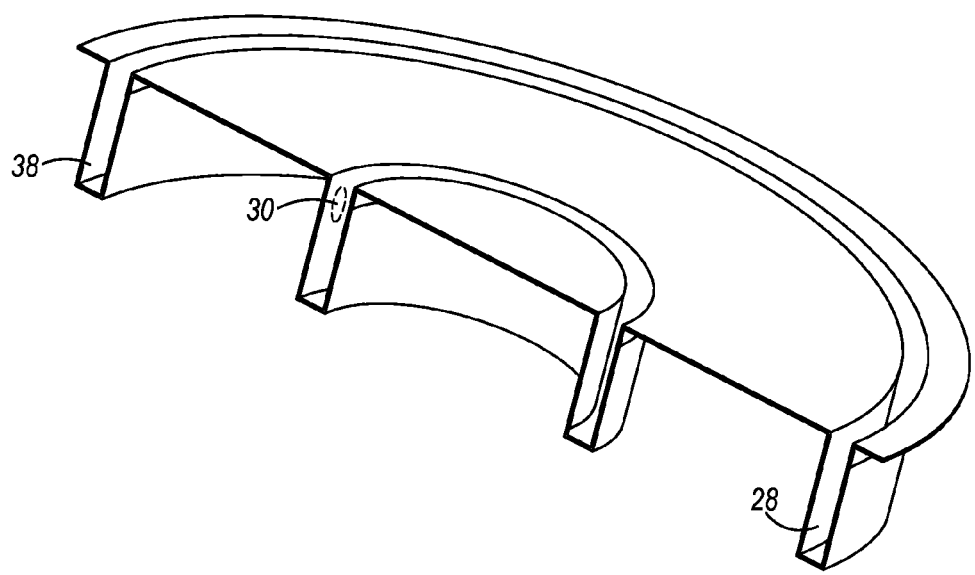
FIG. 9 is a cut-away view of the antenna apparatus of FIG. 8.

FIG. 1 shows a perspective view of an antenna apparatus with open waveguides, conceptually realized upon bending on the H-plane a rectangular waveguide, adapted to support the inventive concepts of some of the embodiments of the present invention. FIG. 8 shows a perspective view of another embodiment of an antenna apparatus with open waveguides, conceptually realized upon bending on the E-plane a rectangular waveguide, adapted to support the inventive concepts of some of the embodiments of the present invention. FIGS. 2 and 9 show cut-away perspective views of FIGS. 1 and 8, respectively, in order to better demonstrate the waveguides. In one embodiment, the present invention includes a conductive first annular waveguide concentric about an axis and configured for operation within an operating frequency band of an RFID reader. A first radiating slot is formed in at least one wall of the first annular waveguide, where the first radiating slot is continuous and concentric about the axis. An odd-multiple of first ports is electrically coupled to the first annular waveguide, where the first ports are equally spaced around the first annular waveguide at a spacing between adjacent ports of one-half of a guided wavelength at a center frequency of the operating frequency band. A second waveguide can also be provided having similar properties as the first waveguide with changes in size, position with respect to other waveguides, slot configurations, number of ports, etc.

In general, the antenna waveguides are configured for conveying radio frequency signals in an operating band of frequencies within an RFID band of frequencies, i.e. 902-928 MHz. Although two waveguides are shown, it is contemplated that further additional electrically conductive open waveguides, featuring analogously defined perimeters, ports, and inter-port spacings, may be provided in concentric relation to the first and second open waveguides about the central axis.

The wavelength referenced herein is the guided wavelength relative to an open transmission line formed, between the ports, by the respective slotted waveguide. More particularly, this guided wavelength is such that a signal applied at one port in the waveguide undergoes a whole number of phase inversions to arrive at another port in the same waveguide. Since the distance traveled along a respective waveguide starting from any one point and ending at the very same point, is an odd multiple of one-half of a guided wavelength, and since the inter-port spacing between adjacent ports on a waveguide is a whole multiple of one-half of a guided wavelength, it follows that the difference between the number of phase inversions going from one port to another port in the same waveguide along the shortest connecting path between said ports, and the number of phase inversions going from that one port to that other port along the longest connecting path in the same waveguide, is an odd number, causing the signal to cancel at the other port and thus yielding high isolation. In some embodiment, each waveguide has a symmetrical shape about each port. For instance, each port could be located at every other corner of an equilateral hexagonally-shaped element. Correspondingly, the ports of each waveguide are arranged, preferably equiangularly about the axis, especially if symmetries or anti-symmetries of the synthesized antenna radiation patterns are desirable. Although this is one embodiment, the ports of each waveguide can also be arranged not equidistantly, or not equiangularly, provided the distance or interport spacing between adjacent ports is a whole multiple of one-half of the guided wavelength. This multiple can be different for different adjacent pairs of ports. By way of non-limiting example, if there are three ports labeled A, B and C, respectively, then the distance between ports A and B can be one-half of the guided wavelength, and the distance between ports B and C can be one and one-half of the guided wavelength, etc.

Preferably, the above-mentioned open waveguide features constant characteristic impedance. When this condition is met, a radio frequency signal fed at any one port will split approximately equally in opposite directions along the respective waveguide. This signal split is exactly equal if the input impedance seen on either side of each port is the same. For instance, in the case of three equidistant ports where each adjacent pair of ports is spaced apart by one-half of the guided wavelength, one split signal will arrive at an adjacent port a half wavelength away (180 degrees phase shift) along the shorter connecting path, while the other split signal will arrive at the same adjacent port a full wavelength away (360 degrees phase shift) along the longer connecting path. The split signals are thus in opposite phase at the same adjacent port. Thus, there is a high (near ideal) signal cancellation at said adjacent port, and therefore, a high port isolation between the transmitting and receiving ports.

Other known means may be used that can concurrently achieve phase inversion and approximately equal amplitude when transmitting between any pair of ports of a multi-port antenna structure, to thereby produce high port isolation. For instance, it may be possible to load sections of each waveguide with distributed or lumped reactive components in order to obtain the so desired phase and amplitude relationships. In this case, each waveguide may be mechanically discontinuous if series elements, e.g., capacitors, are placed along its contour in order to achieve said phase relationships.

In a preferred embodiment, at any given point along each waveguide, the internal surfaces have preferably a constant dimension, e.g., height, width, cross section. In this way, the characteristic impedance in the waveguide is maintained essentially constant, thus substantially facilitating the energy flow and the determination of the distance between the ports, because the guided wavelength is essentially constant. For instance, the waveguide can be configured to yield a 50 ohm impedance match at each port, wherein the input impedance seen on either side of each port along the waveguide is about 100 ohms.

In a preferred embodiment, the present invention employs non-transverse electromagnetic (non-TEM) open waveguides to realize two concentric radiating slots which are fed by multiple RF ports spaced apart one-half of the guided wavelength. Because the guided wavelength in non-TEM waveguides is longer than in TEM waveguides, it is possible to maintain a large size of the radiating elements, thus a large effective antenna area, with a reduced number of ports. Using non-leaky, open rectangular waveguides, bent in the H-plane or the E-plane, provides a mean to achieve this objective. For example, bending the waveguide in the H-plane produces a very thin structure, less than five centimeters thick including a radome, which can be used to host miniaturized electronics.

In practice, an RFID antenna apparatus has been modeled having a sixty centimeter overall diameter and 2.5 centimeter overall height, with seven ports in the external waveguide and three ports in the internal waveguide. This configuration provides improved performance over a prior art antenna ring array with fourteen ports and a height of four centimeters.

In operation, the antenna apparatus of the present invention is employed with an RFID reader, wherein each waveguide slot radiates radio frequency waves in the same operating band of frequencies, e.g., in a frequency range on the order of 902-928 MHz. Other frequency ranges are also contemplated. The use of two or more circular elements arranged concentrically with each other relative to the central axis assists in beamforming. As described herein, an overhead RFID reader transmits the RF interrogating signal through a transmit beam that can be electronically steered and scanned both in azimuth, e.g., over a steering angle of 360 degrees around the central axis, and in elevation, e.g., over a steering angle of about 90 degrees angularly away from the central axis, and receives the return RF responding signal from the tags through a receive beam. The concentric circular waveguide slots serve to narrow the width of these beams, thereby enhancing the tag detection likelihood since more power is available to trigger the tag response. Also, multi-path effects are mitigated since received signal replicas from off-beam directions are strongly attenuated. The concentric waveguide slots also serve to enhance the accuracy of the determination of the location and true bearing of each tag.

Turning now to the embodiments shown in FIGS. 1-2 of the drawings, reference numeral 20 generally identifies a compact, low profile, low-cost, multi-port, open waveguide antenna apparatus with high port isolation, large beam steering angle range, narrow beam width and high polarization synthesis capability, in accordance with the present invention. Antenna apparatus 20 can include an electrically grounded support 22 and an electrically conductive first annular waveguide 24 concentric about an axis 26, and that is mounted on the support 22. The waveguide 24 is configured for operation within an operating frequency band, including a guided wavelength at a center frequency of the operating frequency band. Although a rectangular waveguide cross-section is shown other cross-section shapes can be used equally well in the present invention. The first annular waveguide includes a first radiating slot 28 formed in at least one wall of the first annular waveguide. The first radiating slot 28 is concentric about the axis, and preferably is continuous about the axis. In this example, the first radiating slot is located along an outside perimeter of a top surface of the first annular waveguide, although other slot configurations could be used.

An odd-multiple (seven shown) of first ports 30 are electrically coupled to the first annular waveguide and are arranged, preferably equiangularly or equidistant, along a first perimeter, e.g., circumference, of the first annual waveguide 24 for conveying radio frequency signals in the operating band of frequencies, e.g., on the order of 902-928 MHz. The first ports 30 are successively equally spaced around the first annular waveguide at a spacing between adjacent ports of multiples of one-half of the guided wavelength $\lambda$ ($\lambda/2$, $3\lambda/2$, $5\lambda/2$, and so on) at a center frequency, e.g., 914 MHz, of the operating frequency band. In this example, the ports are equally spaced near a circumference inside of the slot 28. The spacings of the first ports may all be the same, or they can all be different whole multiples of one-half of the guided wavelength of the first operating band.

The antenna apparatus 20 can further include an electrically conductive second annular waveguide 34 mounted on the support 22 concentric with the axis 26 and the first annular waveguide 24, and electrically grounded thereto through the structure 22. The second waveguide 24 is configured for operation within the operating frequency band, including a guided wavelength at the center frequency of the operating frequency band. Although a rectangular waveguide cross-section is shown other cross-section shapes can be used equally well in the present invention. The second annular waveguide includes a second radiating slot 38 formed in at least one wall of the second annular waveguide. The second radiating slot 38 is concentric about the axis, and preferably is continuous about the axis. In this example, the second radiating slot is located along an entire outer wall of the second annular waveguide, although other slot configurations could be used. The second annular waveguide has a diameter less than the first annular waveguide, such that the two waveguide could overlap (not shown). Alternatively, the second waveguide has an outer diameter less than an inner diameter of the first annular waveguide (as shown).

Similar to the first waveguide, the second waveguide 34 includes an odd-multiple (three shown) of second ports 60 that are electrically coupled to the second annular waveguide and are arranged, preferably equiangularly or equidistant, along a first perimeter, e.g., circumference, of the second annual waveguide 24 for conveying radio frequency signals in the operating band of frequencies, e.g. 902-928 MHz. The second ports 60 are successively equally spaced around the first annular waveguide at a spacing between adjacent ports of one-half of a guided wavelength $\lambda$ ($\lambda/2$, $3\lambda/2$, $5\lambda/2$, and so on) at a center frequency, e.g., 914 MHz, of the second operating frequency band. In this example, the ports 60 are equally spaced near a circumference just inside of the slot 38. The spacings of the second ports may all be the same, or they can all be different whole multiples of one-half of the guided wavelength of the second waveguide.

The first and second spacings may also be different if the guided wavelength in the first waveguide is different from the guided wavelength in the second waveguide. In fact, the guided wavelength may differ between the first and second waveguide, depending on their respective cross-section shapes, slot arrangement, filling material, and curvature radius. Although only two annular waveguides 24, 34 have been illustrated, it will be understood that additional, electrically conductive, waveguides, featuring analogous slots, ports, dimensions, spacings, etc. may be provided in concentric relation to the first and second waveguides.

Said numerical operating band of frequencies is merely exemplary, and is especially useful when the antenna apparatus of the present invention is employed with a radio frequency identification (RFID) reader. It will be understood that different operating frequency bands and different operating frequency ranges could also be used, for instance, by scaling the geometrical dimensions of the apparatus 20. Although seven first ports have been illustrated for the first waveguide 24, and three second ports have been illustrated for the second waveguide 34, any odd or even number of ports greater than two can be employed. Although the number of first ports exceeds the number of second ports in the embodiment shown in FIGS. 1-2, it is also contemplated that the numbers of the first and second ports could be equal in some embodiments, and that the number of first ports could be less than the number of second ports in other embodiments. Preferably, in order to achieve desired symmetries or anti-symmetries of the synthesized antenna radiation patterns, the first and second circular waveguides are symmetrical and concentric relative to the central axis 26 that extends generally perpendicularly to the ground structure 22, i.e., the aforementioned vertical plumb line originating from the center of an antenna of a ceiling-mounted RFID reader. The first and second circular waveguides are preferably parallel and coaxial, but not necessarily, and they may be coplanar (not shown) having the same elevation relative to the ground structure 22, or they may be offset from each other along the axis (shown) by a height of either waveguide 42.

Figure 3:
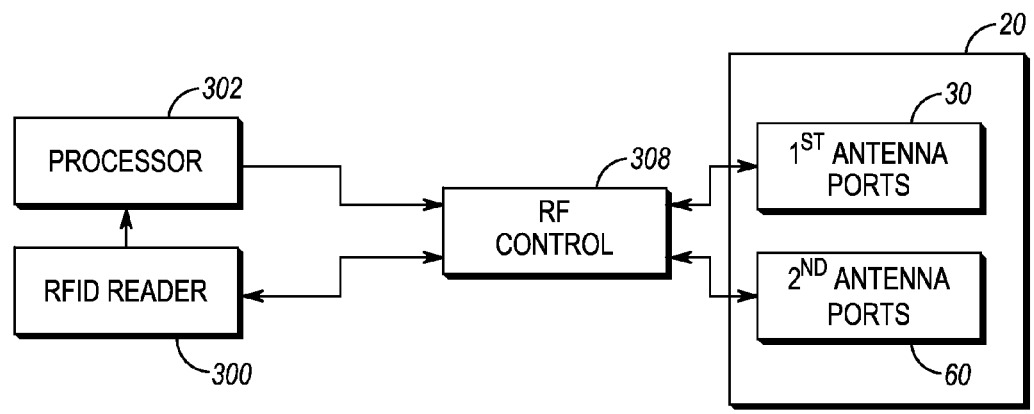
FIG. 3 is a simplified block diagram of a system, in accordance with the present invention.

Referring to FIG. 3, in use as an RFID antenna, a plurality of RF transceivers (sources and receivers), together with antenna matching circuits, preferably one matching circuit for each port 30, 60 are included in an RF control module 308, which can be mounted at the opposite side of the ground structure 22. Each source is controlled by a processor 302, using feedback from the RFID reader 300, to generate an RF signal that is conducted, through a matching circuit if needed, to each port 30, 60 of the respective waveguide 24, 34. Thus, each radio frequency signal is fed to each port, preferably simultaneously, and is radiated from the waveguides of the antenna apparatus 20. The ten illustrated ports, so decoupled, can produce a wide variety of high-gain narrow width beams featuring many different polarization states, for instance, by employing known generalized beamforming synthesis techniques under control of the processor, e.g. controlling an output amplitude and phase of the respective radio frequency signal for each radio frequency transceiver. The RF signal emitted at any one port will split equally in opposite circumferential directions along the respective circular waveguide. One split signal will arrive at an adjacent port a half wavelength away (180 degrees out of phase), while the other split signal will arrive at the same adjacent port a whole number of full wavelengths away (thus, in phase). The same analysis is valid for any other pair of ports due to the mentioned constraints on the perimeters of the open waveguides 24, 34 and the inter-port spacings along either waveguide. The split signals thus feature opposite phases and approximately equal amplitudes (because the waveguides exhibit small attenuation), and substantially cancel each other out, at the same adjacent port. Due to the aforementioned constraints, all pairs of ports belonging to the same waveguide feature the same properties. In practice, isolation between the ports is on the order of 12 to 30 dB, with lower isolation between ports on different waveguides, and with larger isolation between ports on the same waveguide.

Thus, there is a high port isolation between the ports across the aforementioned operating band, provided that the attenuation losses of the antenna apparatus are moderate. Advantageously, the antenna array of this disclosure is employed with a radio frequency (RF) identification (RFID) reader, especially where the reader is mounted overhead on the ceiling of a controlled area in which RFID-tagged items are located. The ground structure 22 is mounted on, or parallel to, the ceiling, and the two circular waveguide slots 28, 38 are exposed downwardly and outwardly away from the ground structure 22 such that the central axis 26, i.e., the aforementioned plumb line, is generally vertical. The use of two waveguides arranged concentrically with each other relative to the vertical central axis assists in beamforming.

As described above, the overhead RFID reader transmits the RF interrogating signal through a transmit beam that is electronically steered by weighting factors provided by the processor to the RF control, and scanned both in azimuth, e.g., over a steering angle of 360 degrees around the axis 26, and in elevation, e.g., over a steering angle of about 90 degrees angularly away from the axis 26, and receives the return RF signal through a receive beam from the tags. The optimized complex weighting factors of the signals feeding all the ports of the concentric waveguides help narrow the widths of these beams, e.g., to beam widths on the order of 10 degrees to 30 degrees, thereby enhancing the antenna pattern gain and the accuracy of the determination of the location and true bearing of each tag. A different optimized set of weighting factors is applied for each direction of beam steering. Antenna gain of over 10 dBi for elevation angles in a range of between 25 degrees and 65 degrees, and azimuth angles in a range of between 0 degrees and 360 degrees, are obtainable.

Figure 4:
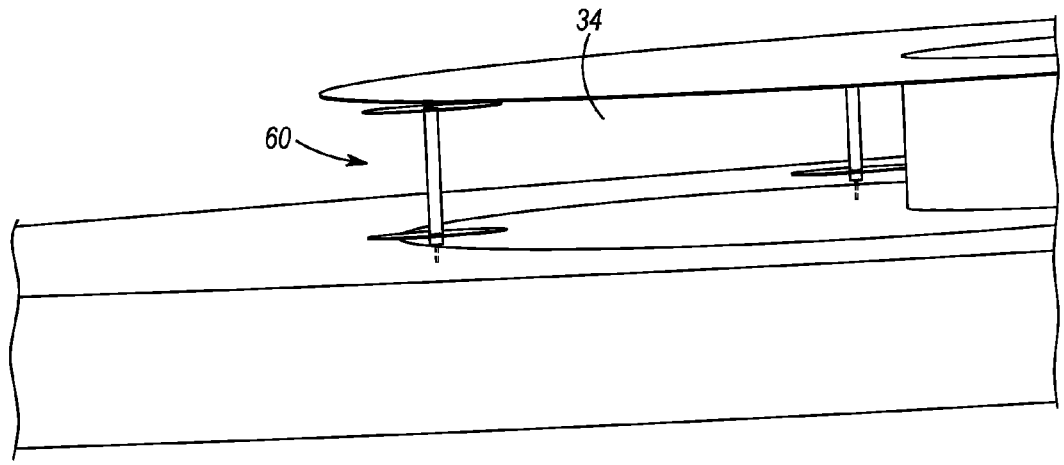
FIG. 4 is an enlarged, sectional view taken on line 4-4 of FIG. 2.
Figure 5:
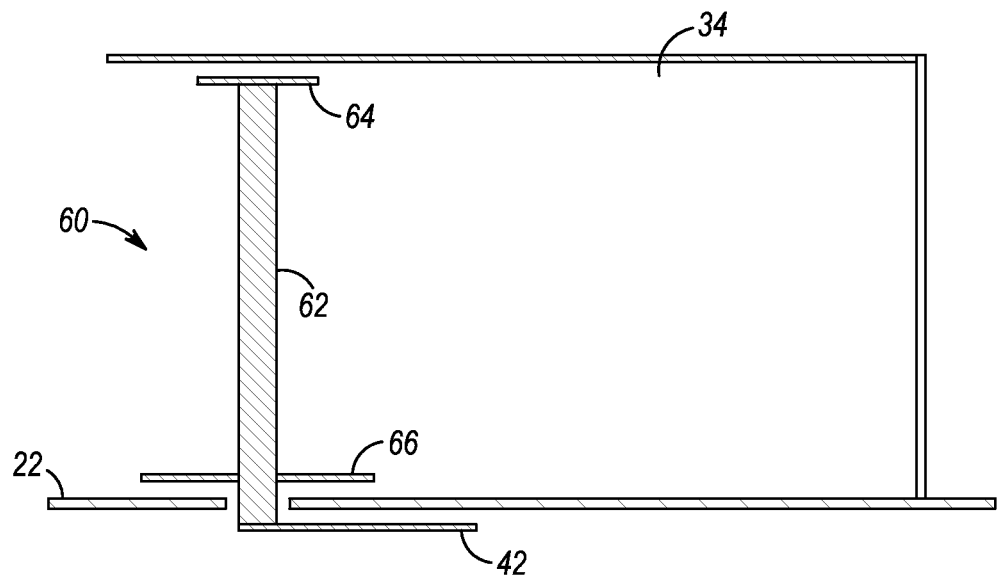
FIG. 5 is a cross-sectional view of a signal feed embodiment of an antenna apparatus in accordance with the present disclosure.
Figure 6:
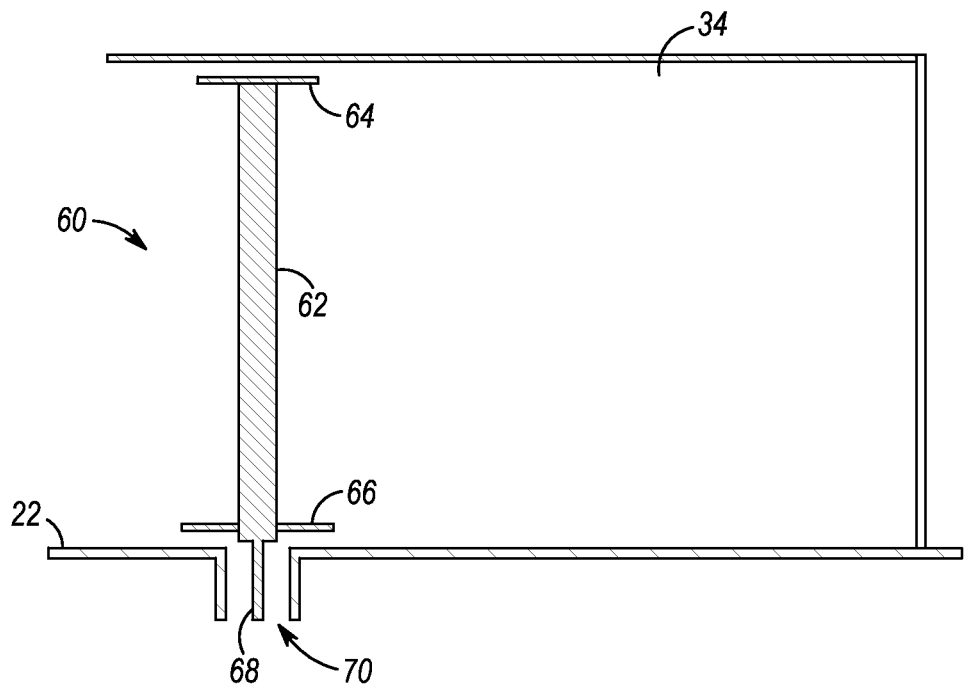
FIG. 6 is a view analogous to FIG. 5, but showing a different physical embodiment providing a signal feed.

As shown in FIGS. 4-6, representative port 60 is configured as a top-loaded monopole exciter that includes an elongated electrically conductive solid post 62 for conveying the radio frequency signals to the respective waveguide. Each post includes upper and lower conductive elements or discs mounted in spaced apart relation on the post, wherein the upper conductive element 64 is adjacent the top of the post 62 is spaced from a top internal surface of the respective waveguide and serves as a series capacitor therewith, and the lower conductive element 66 is spaced from a bottom internal surface of the respective waveguide, and serves as a shunt capacitor therewith to achieve a desired impedance match. A dielectric (constituted of Teflon™ for example but not illustrated so as to simplify the drawing) can be located between the upper conductive element 64 and the respective waveguide and between the lower conductive element 66 and the waveguide to support the monopole. The size and spacing of these disks 64, 66, as well as the permittivity of the aforementioned dielectrics, control the value of their capacitances and are employed to optimize the aforementioned impedance match, and may replace the aforementioned adjustment elements of the RF sources. The post 62 extends through the ground structure 22, and the bottom end of the post 62 is galvanically connected to the aforementioned RF source through a coaxial cable 68 (in FIG. 6), stripline or microstrip feed line 42 (in FIG. 5), or other suitable connection. A dielectric support between the feed line 42 (in FIG. 5) and the ground structure 22 has been omitted so as not to encumber the drawing.

The characteristic impedance of the connection is frequently designed to be the same as the stripline or microstrip feed line 42, e.g., 50 ohms, so that no RF insertion loss is caused by the microstrip-to-coaxial transition. However, there may be cases when an impedance discontinuity can be usefully employed to improve the impedance match between the antenna and the connection. For instance, if the natural impedance seen at the antenna ports is 200 ohms and the microstrip line impedance is 50 ohms, then the geometrical and dielectric parameters of the connection can be chosen to produce an electrical length of a quarter wavelength and a characteristic impedance of 100 ohms, thereby producing, as it is well known in the art, a very good impedance match between the antenna and the microstrip feed line 42 about the antenna center operating frequency. It will be understood that a different feed arrangement, such as a coaxial cable and mated coaxial RF connectors for each port, could also be used instead of the microstrip or stripline arrangement to feed a signal to the conductor 34.

Figure 7:
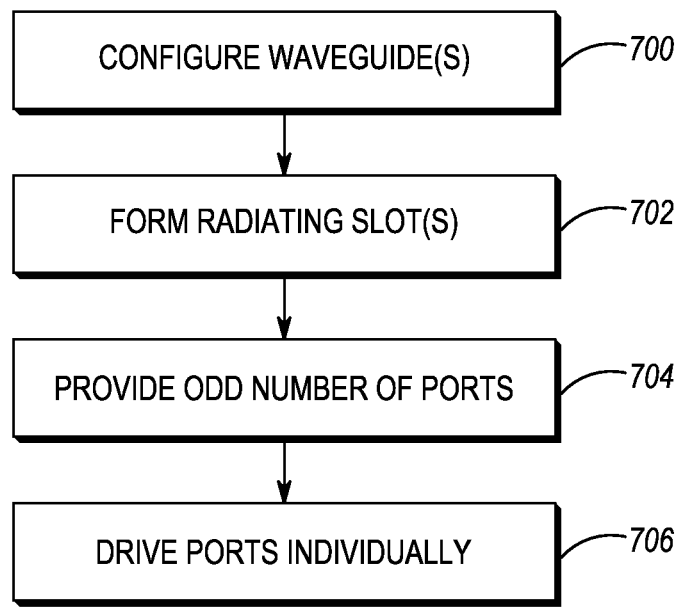
FIG. 7 is a flowchart of a method, in accordance with the present invention.

FIG. 7 illustrates a method for providing an open waveguide antenna apparatus for a radio frequency identification reader, in accordance with the present invention.

A first step 700 includes configuring a conductive first annular waveguide concentric about an axis for operation within an operating frequency band for an RFID reader.

A next step 702 includes forming a first radiating slot in at least one wall of the first annular waveguide, the first radiating slot being concentric about the axis.

A next step 704 includes providing an odd-multiple of first ports electrically coupled to the first annular waveguide, the first ports being equally spaced around the first annular waveguide at a spacing between adjacent ports of one-half of a guided wavelength at a center frequency of the operating frequency band.

A next step 706 includes driving each post with a respective radio frequency signal by controlling an output amplitude and phase of each respective radio frequency signal to provide beamforming of an RFID signal radiated outwardly from the respective open waveguide.

Advantageously, the present invention allows for a thinner and more aesthetic antenna array than a normal antenna array that use multiple discrete antenna elements, while providing improved performance. In addition, the use of non-TEM waveguides increases the guided wavelength over TEM waveguides making it possible to maintain a large size of the radiating elements, thus a large effective antenna area, while decreasing the number of ports for a given annulus diameter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An open waveguide antenna apparatus for a radio frequency identification reader, the antenna apparatus comprising:
   a conductive first annular waveguide concentric about an axis and configured for operation within an operating frequency band, featuring a guided wavelength at a center frequency of the operating frequency band;
   a first radiating slot formed in at least one wall of the first annular waveguide, the first radiating slot being substantially annular in shape and concentric about the axis; and
   an odd-multiple of first ports electrically coupled to the first annular waveguide, the first ports being equally spaced around the first annular waveguide at a spacing between adjacent ports of one-half of a guided wavelength at a center frequency of the operating frequency band.

2. The antenna apparatus of claim 1, wherein the first annular waveguide is rectangular, and the first radiating slot is continuous around the first annular waveguide.

3. The antenna apparatus of claim 2, wherein the first radiating slot is located along an outside perimeter of a top surface of the first annular waveguide.

4. The antenna apparatus of claim 1, further comprising a second annular waveguide concentric with the first annular waveguide and electrically grounded thereto, the second annular waveguide configured for operation within the same operating frequency band, featuring a second guided wavelength at the center frequency of the operating frequency band the second annular waveguide having a second radiating slot formed in at least one wall of the second annular waveguide and being concentric about the axis, the second annular waveguide having a diameter less than the first annular waveguide, the second annular waveguide including an odd-multiple of second ports, wherein the second ports are equally spaced around the first annular waveguide at a spacing between adjacent ports of one-half of the second guided wavelength at the center frequency of the operating frequency band.

5. The antenna apparatus of claim 4, wherein the first and second annular waveguides have a rectangular cross-section, and the first and second radiating slots are continuous around their respective waveguides.

6. The antenna apparatus of claim 5, wherein the first radiating slot is located along an outside perimeter of a top surface of the first annular waveguide, and the second radiating slot is located along an outside wall of the second annular waveguide.

7. The antenna apparatus of claim 4, wherein the first and second waveguides are parallel and are one of the group of:
   being coplanar with each other, or being offset from each other along the axis by a height of either waveguide.

8. The antenna apparatus of claim 4, wherein at least one of the first and second waveguides is operable in a non-transverse electromagnetic mode.

9. The antenna apparatus of claim 4, wherein the operating frequency band lies within a frequency range of 902-928 MHz to accommodate operation of the radio frequency identification reader.

10. The antenna apparatus of claim 1, wherein each port features a top-loaded monopole exciter that includes an elongated electrically conductive post for conveying radio frequency signals to the respective waveguide, each post including and upper and lower conductive elements mounted in spaced apart relation on the post, and wherein the upper conductive element is spaced from a top internal surface of the respective waveguide, and the lower conductive element is spaced from a bottom internal surface of the respective waveguide, to achieve a desired impedance match.

11. The antenna apparatus of claim 10, further comprising:
- a plurality of radio frequency transceivers, each transceiver being coupled to drive a respective port with a respective radio frequency signal; and
- a processor operable to control an output amplitude and phase of the respective radio frequency signal for each radio frequency transceiver to provide beamforming of an RFID signal radiated outwardly from the respective open waveguide.

12. A method for providing an open waveguide antenna apparatus for a radio frequency identification reader, the method comprising:
- configuring a conductive first annular waveguide concentric about an axis for operation within an operating frequency band, featuring a guided wavelength at a center frequency of the operating frequency band;
- forming a first radiating slot in at least one wall of the first annular waveguide, the first radiating slot being substantially annular in shape and concentric about the axis; and
- providing an odd-multiple of first ports electrically coupled to the first annular waveguide, the first ports being equally spaced around the first annular waveguide at a spacing between adjacent ports of one-half of the guided wavelength at the center frequency of the operating frequency band.

13. The method of claim 12, wherein configuring further includes a second annular waveguide concentric with the first annular waveguide and electrically grounded thereto, the second annular waveguide configured for operation within the same operating frequency band, featuring a second guided wavelength at the center frequency of the operating frequency band the second annular waveguide, and wherein forming includes forming a second radiating slot in at least one wall of the second annular waveguide and being concentric about the axis, the second annular waveguide having a diameter less than the first annular waveguide, and wherein providing includes providing the second annular waveguide with an odd-multiple of second ports, wherein the second ports are equally spaced around the first annular waveguide at a spacing between adjacent ports of one-half of the second guided wavelength at the center frequency of the operating frequency band.

14. The method of claim 12, further comprising driving each post with a respective radio frequency signal by controlling an output amplitude and phase of each respective radio frequency signal to provide beamforming of an RFID signal radiated outwardly from the respective open waveguide.

* * * * *